United States Patent
Matecki et al.

(10) Patent No.: US 11,088,412 B2
(45) Date of Patent: Aug. 10, 2021

(54) VEHICLE BATTERY TRAY WITH TUBULAR PERIPHERAL WALL

(71) Applicant: Shape Corp., Grand Haven, MI (US)

(72) Inventors: Joseph Robert Matecki, Allendale, MI (US); Mark Charles Stephens, Grand Rapids, MI (US)

(73) Assignee: SHAPE CORP., Kalamazoo, MI (US)

( * ) Notice: Subject to any disclaimer, the term of this patent is extended or adjusted under 35 U.S.C. 154(b) by 46 days.

(21) Appl. No.: 16/130,580

(22) Filed: Sep. 13, 2018

(65) Prior Publication Data

US 2019/0081298 A1    Mar. 14, 2019

Related U.S. Application Data

(60) Provisional application No. 62/558,100, filed on Sep. 13, 2017.

(51) Int. Cl.
| | |
|---|---|
| *H01M 50/00* | (2021.01) |
| *H01M 50/20* | (2021.01) |
| *B60K 1/04* | (2019.01) |
| *B60L 50/60* | (2019.01) |

(52) U.S. Cl.
CPC .............. *H01M 50/20* (2021.01); *B60K 1/04* (2013.01); *B60L 50/66* (2019.02); *B60K 2001/0438* (2013.01); *B60K 2001/0472* (2013.01); *H01M 2220/20* (2013.01)

(58) Field of Classification Search
CPC .... H01M 2/01077; H01M 10/443; B60K 1/04
See application file for complete search history.

(56) References Cited

U.S. PATENT DOCUMENTS

| | | | |
|---|---|---|---|
| 3,708,028 | A | 1/1973 | Hafer |
| 3,930,552 | A | 1/1976 | Kunkle et al. |
| 3,983,952 | A | 10/1976 | McKee |
| 4,174,014 | A | 11/1979 | Bjorksten |
| 4,252,206 | A | 2/1981 | Burkholder et al. |

(Continued)

FOREIGN PATENT DOCUMENTS

| | | |
|---|---|---|
| AT | 511428 A1 | 11/2012 |
| AT | 511670 A1 | 1/2013 |

(Continued)

OTHER PUBLICATIONS

Korean Intellectual Property Office (ISA), International Search Report and Written Opinion for International Application No. PCT/US2018/050889, dated Mar. 21, 2019.

(Continued)

*Primary Examiner* — Hau V Phan
(74) *Attorney, Agent, or Firm* — Bodman PLC

(57) ABSTRACT

A battery tray for supporting batteries at a lower portion of a vehicle frame includes a floor plate and a perimeter wall disposed around the of the floor plate to substantially surround a containment area for storing vehicle battery cells. The perimeter wall includes a tubular member that extends along a periphery of the floor plate to form a perimeter wall around a containment area for storing vehicle battery cells. The perimeter wall is attached at an upper surface of the floor plate, such that the containment area may be generally bounded horizontally by the perimeter wall and at the bottom by the floor plate.

20 Claims, 12 Drawing Sheets

(56) References Cited

U.S. PATENT DOCUMENTS

| | | | |
|---|---|---|---|
| 4,317,497 A | 3/1982 | Alt et al. | |
| 4,339,015 A * | 7/1982 | Fowkes | B60K 1/04 |
| | | | 180/65.1 |
| 4,506,748 A | 3/1985 | Thomas | |
| 5,015,545 A | 5/1991 | Brooks | |
| 5,198,638 A | 3/1993 | Massacesi | |
| 5,378,555 A | 1/1995 | Waters et al. | |
| 5,390,754 A | 2/1995 | Masuyama et al. | |
| 5,392,873 A | 2/1995 | Masuyama et al. | |
| 5,476,151 A | 12/1995 | Tsuchida et al. | |
| 5,501,289 A * | 3/1996 | Nishikawa | B60K 1/04 |
| | | | 180/68.5 |
| 5,513,721 A | 5/1996 | Ogawa et al. | |
| 5,523,666 A | 6/1996 | Hoelzl | |
| 5,534,364 A | 7/1996 | Watanabe et al. | |
| 5,549,443 A | 8/1996 | Hammerslag | |
| 5,555,950 A | 9/1996 | Harada et al. | |
| 5,558,949 A | 9/1996 | Iwatsuki et al. | |
| 5,561,359 A | 10/1996 | Matsuura et al. | |
| 5,567,542 A | 10/1996 | Bae | |
| 5,585,204 A * | 12/1996 | Oshida | H01M 10/443 |
| | | | 429/120 |
| 5,585,205 A | 12/1996 | Kohchi | |
| 5,612,606 A | 3/1997 | Guimarin et al. | |
| 5,620,057 A | 4/1997 | Klemen et al. | |
| 5,709,280 A | 1/1998 | Beckley et al. | |
| 5,736,272 A * | 4/1998 | Veenstra | H01M 2/1077 |
| | | | 429/100 |
| 5,760,569 A | 6/1998 | Chase, Jr. | |
| 5,833,023 A | 11/1998 | Shimizu | |
| 5,853,058 A | 12/1998 | Endo et al. | |
| 5,866,276 A | 2/1999 | Ogami et al. | |
| 5,934,053 A | 8/1999 | Fillman et al. | |
| 6,040,080 A | 3/2000 | Minami et al. | |
| 6,079,984 A | 6/2000 | Torres et al. | |
| 6,085,854 A | 7/2000 | Nishikawa | |
| 6,094,927 A | 8/2000 | Anazawa et al. | |
| 6,109,380 A | 8/2000 | Veenstra | |
| 6,130,003 A | 10/2000 | Etoh et al. | |
| 6,158,538 A | 12/2000 | Botzelmann et al. | |
| 6,188,574 B1 * | 2/2001 | Anazawa | B60K 1/04 |
| | | | 361/695 |
| 6,189,635 B1 | 2/2001 | Schuler et al. | |
| 6,220,380 B1 | 4/2001 | Mita et al. | |
| 6,227,322 B1 | 5/2001 | Nishikawa | |
| 6,260,645 B1 | 7/2001 | Pawlowski et al. | |
| 6,402,229 B1 | 6/2002 | Suganuma | |
| 6,406,812 B1 | 6/2002 | Dreulle et al. | |
| 6,462,949 B1 | 10/2002 | Parish, IV et al. | |
| 6,541,151 B2 | 4/2003 | Minamiura et al. | |
| 6,541,154 B2 | 4/2003 | Oogami et al. | |
| 6,565,836 B2 | 5/2003 | Ovshinsky et al. | |
| 6,598,691 B2 | 7/2003 | Mita et al. | |
| 6,648,090 B2 | 11/2003 | Iwase | |
| 6,668,957 B2 | 12/2003 | King | |
| 6,736,229 B1 | 5/2004 | Amori et al. | |
| 6,811,197 B1 | 11/2004 | Grabowski et al. | |
| 7,004,274 B2 | 2/2006 | Shibasawa et al. | |
| 7,017,361 B2 | 3/2006 | Kwon | |
| 7,070,015 B2 | 7/2006 | Mathews et al. | |
| 7,128,999 B1 | 10/2006 | Martin et al. | |
| 7,201,384 B2 | 4/2007 | Chaney | |
| 7,207,405 B2 | 4/2007 | Reid et al. | |
| 7,221,123 B2 | 5/2007 | Chen | |
| 7,249,644 B2 | 7/2007 | Honda et al. | |
| 7,267,190 B2 | 9/2007 | Hirano | |
| 7,323,272 B2 | 1/2008 | Ambrosio et al. | |
| 7,401,669 B2 | 7/2008 | Fujii et al. | |
| 7,405,022 B2 | 7/2008 | Kang et al. | |
| 7,412,309 B2 | 8/2008 | Honda | |
| 7,416,039 B1 | 8/2008 | Anderson et al. | |
| 7,424,926 B2 | 9/2008 | Tsuchiya | |
| 7,427,156 B2 | 9/2008 | Ambrosio et al. | |
| 7,501,793 B2 | 3/2009 | Kadouchi et al. | |
| 7,507,499 B2 | 3/2009 | Zhou et al. | |
| 7,520,355 B2 | 4/2009 | Chaney | |
| 7,610,978 B2 | 11/2009 | Takasaki et al. | |
| 7,654,351 B2 | 2/2010 | Koike et al. | |
| 7,654,352 B2 | 2/2010 | Takasaki et al. | |
| 7,661,370 B2 | 2/2010 | Pike et al. | |
| 7,686,111 B2 | 3/2010 | Koenekamp et al. | |
| 7,687,192 B2 | 3/2010 | Yoon et al. | |
| 7,713,655 B2 | 5/2010 | Ha et al. | |
| 7,749,644 B2 | 7/2010 | Nishino | |
| 7,807,288 B2 | 10/2010 | Yoon et al. | |
| 7,854,282 B2 | 12/2010 | Lee et al. | |
| 7,858,229 B2 | 12/2010 | Shin et al. | |
| 7,875,378 B2 | 1/2011 | Yang et al. | |
| 7,879,480 B2 | 2/2011 | Yoon et al. | |
| 7,879,485 B2 | 2/2011 | Yoon et al. | |
| 7,926,602 B2 | 4/2011 | Takasaki | |
| 7,931,105 B2 | 4/2011 | Sato et al. | |
| 7,948,207 B2 | 5/2011 | Scheucher | |
| 7,967,093 B2 | 6/2011 | Nagasaka | |
| 7,984,779 B2 | 7/2011 | Boegelein et al. | |
| 7,990,105 B2 | 8/2011 | Matsumoto et al. | |
| 7,993,155 B2 | 8/2011 | Heichal et al. | |
| 7,997,368 B2 | 8/2011 | Takasaki et al. | |
| 8,006,626 B2 | 8/2011 | Kumar et al. | |
| 8,006,793 B2 | 8/2011 | Heichal et al. | |
| 8,012,620 B2 | 9/2011 | Takasaki et al. | |
| 8,034,476 B2 | 10/2011 | Ha et al. | |
| 8,037,954 B2 | 10/2011 | Taguchi | |
| 8,079,435 B2 | 12/2011 | Takasaki et al. | |
| 8,091,669 B2 | 1/2012 | Taneda et al. | |
| 8,110,300 B2 | 2/2012 | Niedzwiecki et al. | |
| 8,146,694 B2 | 4/2012 | Hamidi | |
| 8,163,420 B2 | 4/2012 | Okada et al. | |
| 8,167,070 B2 | 5/2012 | Takamura et al. | |
| 8,186,468 B2 | 5/2012 | Parrett et al. | |
| 8,187,736 B2 | 5/2012 | Park et al. | |
| 8,205,702 B2 | 6/2012 | Hoermandinger et al. | |
| 8,206,846 B2 | 6/2012 | Yang et al. | |
| 8,210,301 B2 | 7/2012 | Hashimoto et al. | |
| 8,211,564 B2 | 7/2012 | Choi et al. | |
| 8,256,552 B2 | 9/2012 | Okada | |
| 8,268,469 B2 | 9/2012 | Hermann et al. | |
| 8,268,472 B2 | 9/2012 | Ronning et al. | |
| 8,276,697 B2 | 10/2012 | Takasaki | |
| 8,286,743 B2 | 10/2012 | Rawlinson | |
| 8,298,698 B2 | 10/2012 | Chung et al. | |
| 8,304,104 B2 | 11/2012 | Lee et al. | |
| 8,307,930 B2 | 11/2012 | Sailor et al. | |
| 8,323,819 B2 | 12/2012 | Lee et al. | |
| 8,327,962 B2 | 12/2012 | Bergmeier et al. | |
| 8,343,647 B2 | 1/2013 | Ahn et al. | |
| 8,353,374 B2 | 1/2013 | Sugawara et al. | |
| 8,371,401 B1 | 2/2013 | Illustrato | |
| 8,397,853 B2 | 3/2013 | Stefani et al. | |
| 8,409,743 B2 | 4/2013 | Okada et al. | |
| 8,418,795 B2 | 4/2013 | Sasage et al. | |
| 8,420,245 B2 | 4/2013 | Im et al. | |
| 8,439,144 B2 | 5/2013 | Murase | |
| 8,453,773 B2 | 6/2013 | Hill et al. | |
| 8,453,778 B2 | 6/2013 | Bannier et al. | |
| 8,455,122 B2 | 6/2013 | Shin et al. | |
| 8,465,866 B2 | 6/2013 | Kim | |
| 8,481,343 B2 | 7/2013 | Hsin et al. | |
| 8,486,557 B2 | 7/2013 | Lee et al. | |
| 8,492,016 B2 | 7/2013 | Shin et al. | |
| 8,501,344 B2 | 8/2013 | Yang et al. | |
| 8,511,412 B2 | 8/2013 | Kawaguchi et al. | |
| 8,540,282 B2 | 9/2013 | Yoda et al. | |
| 8,551,640 B2 | 10/2013 | Hedrich et al. | |
| 8,557,425 B2 | 10/2013 | Ronning et al. | |
| 8,561,743 B2 | 10/2013 | Iwasa et al. | |
| 8,563,155 B2 | 10/2013 | Lee et al. | |
| 8,567,543 B2 | 10/2013 | Kubota et al. | |
| 8,584,780 B2 | 11/2013 | Yu et al. | |
| 8,587,907 B2 | 11/2013 | Gaben | |
| 8,592,069 B1 | 11/2013 | Anderson et al. | |
| 8,602,139 B2 | 12/2013 | Takamura et al. | |
| 8,609,271 B2 | 12/2013 | Yoon et al. | |

(56) References Cited

U.S. PATENT DOCUMENTS

| | | |
|---|---|---|
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 | 3/2016 | Hihara et al. |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |

(56) References Cited

U.S. PATENT DOCUMENTS

| | | |
|---|---|---|
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 | 8/2017 | Berger et al. |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 10,059,382 B2 | 8/2018 | Nusier et al. |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0160583 A1 | 6/2012 | Rawlinson |
| 2012/0223113 A1 | 9/2012 | Gaisne et al. |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0204583 A1 | 7/2015 | Stephan et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0259011 A1* | 9/2015 | Deckard ............. B62D 21/183 280/781 |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |
| 2016/0159221 A1 | 6/2016 | Chen et al. |
| 2016/0164053 A1 | 6/2016 | Lee et al. |
| 2016/0167544 A1 | 6/2016 | Barbat et al. |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |

(56) References Cited

U.S. PATENT DOCUMENTS

| | | |
|---|---|---|
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe et al. |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010006514 A1 | 8/2011 |
| DE | 102010007414 A1 | 8/2011 |
| DE | 102010009063 A1 | 8/2011 |
| DE | 102010012992 A1 | 9/2011 |
| DE | 102010012996 A1 | 9/2011 |
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |
| DE | 102011109011 A1 | 5/2013 |
| DE | 102011120010 A1 | 6/2013 |
| DE | 102012000622 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |

(56) References Cited

FOREIGN PATENT DOCUMENTS

| | | |
|---|---|---|
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 A1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 B2 | 7/1998 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | 05193370 | 3/1993 |
| JP | H05193366 A | 8/1993 |
| JP | H05201356 A | 8/1993 |
| JP | H08268083 A | 10/1996 |
| JP | H08276752 A | 10/1996 |
| JP | H1075504 A | 3/1998 |
| JP | H10109548 A | 4/1998 |
| JP | H10149805 A | 6/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3085346 B2 | 9/2000 |
| JP | 3199296 B2 | 8/2001 |
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 20120030014 A | 3/2012 |
| KR | 20140007063 A | 1/2014 |
| KR | 101565980 B1 | 11/2015 |
| KR | 101565981 B1 | 11/2015 |
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |
| KR | 20170062845 A | 6/2017 |
| KR | 20170065764 A | 6/2017 |
| KR | 20170065771 A | 6/2017 |
| KR | 20170065854 A | 6/2017 |
| KR | 20170070080 A | 6/2017 |
| KR | 1020170067240 A | 6/2017 |
| SE | 507909 C2 | 7/1998 |
| TW | 201425112 A | 7/2014 |
| TW | I467830 B | 1/2015 |
| TW | I482718 B | 5/2015 |
| WO | 0074964 A1 | 12/2000 |
| WO | 2006100005 A2 | 9/2006 |
| WO | 2006100006 A1 | 9/2006 |
| WO | 2008104356 A1 | 9/2008 |
| WO | 2008104358 A1 | 9/2008 |
| WO | 2008104376 A1 | 9/2008 |
| WO | 2008131935 A2 | 11/2008 |
| WO | 2009080151 A1 | 7/2009 |
| WO | 2009080166 A1 | 7/2009 |
| WO | 2009103462 A1 | 8/2009 |
| WO | 2010004192 A2 | 1/2010 |
| WO | 2010012337 A1 | 2/2010 |
| WO | 2010012338 A1 | 2/2010 |
| WO | 2010012342 A1 | 2/2010 |
| WO | 2010040520 A2 | 4/2010 |

(56) References Cited

FOREIGN PATENT DOCUMENTS

| | | | |
|---|---|---|---|
| WO | 2010063365 A1 | 6/2010 |
| WO | 2010069713 A1 | 6/2010 |
| WO | 2010076053 A1 | 7/2010 |
| WO | 2010076055 A1 | 7/2010 |
| WO | WO-2010076452 A1 | 7/2010 |
| WO | 2011030041 A1 | 3/2011 |
| WO | 2011083980 A2 | 7/2011 |
| WO | 2011106851 A2 | 9/2011 |
| WO | 2011116801 A1 | 9/2011 |
| WO | 2011116959 A2 | 9/2011 |
| WO | 2011121757 A1 | 10/2011 |
| WO | 2011134815 A1 | 11/2011 |
| WO | 2011134828 A1 | 11/2011 |
| WO | 2012025710 A2 | 3/2012 |
| WO | 2012063025 A2 | 5/2012 |
| WO | 2012065853 A1 | 5/2012 |
| WO | 2012065855 A1 | 5/2012 |
| WO | 2012069349 A1 | 5/2012 |
| WO | 2012084132 A2 | 6/2012 |
| WO | 2012093233 A1 | 7/2012 |
| WO | 2012097514 A1 | 7/2012 |
| WO | 2012114040 A1 | 8/2012 |
| WO | 2012116608 A1 | 9/2012 |
| WO | 2012119424 A1 | 9/2012 |
| WO | 2012163504 A2 | 12/2012 |
| WO | 2013020707 A2 | 2/2013 |
| WO | 2013027982 A2 | 2/2013 |
| WO | 2013042628 A1 | 3/2013 |
| WO | 2013080008 A2 | 6/2013 |
| WO | 2013188680 A1 | 12/2013 |
| WO | 2014114511 A1 | 7/2014 |
| WO | 2014140412 A1 | 9/2014 |
| WO | 2014140463 A1 | 9/2014 |
| WO | 2014183995 A1 | 11/2014 |
| WO | 2014191651 A2 | 12/2014 |
| WO | 2015018658 A1 | 2/2015 |
| WO | 2015043869 A1 | 4/2015 |
| WO | 2015149660 A1 | 10/2015 |
| WO | 2016029084 A1 | 2/2016 |
| WO | 2016046144 A1 | 3/2016 |
| WO | 2016046145 A1 | 3/2016 |
| WO | 2016046146 A1 | 3/2016 |
| WO | 2016046147 A1 | 3/2016 |
| WO | 2016072822 A1 | 5/2016 |
| WO | 2016086274 A1 | 6/2016 |
| WO | 2016106658 A1 | 7/2016 |
| WO | 2016132280 A1 | 8/2016 |
| WO | 2016203130 A1 | 12/2016 |
| WO | 2017025592 A1 | 2/2017 |
| WO | 2017032571 A1 | 3/2017 |
| WO | 2017060608 A1 | 4/2017 |
| WO | 2017084938 A1 | 5/2017 |
| WO | 2017103449 A1 | 6/2017 |
| WO | WO-2018033880 A2 | 2/2018 |
| WO | 2018065554 A1 | 4/2018 |
| WO | 2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

International Searching Authority (KR), International Search Report and Written Opinion for International Application No. PCT/IB2017/055002, dated Jul. 19, 2018.
International Searhcing Authority, International Search Report and Written Opinion for Application No. PCT/IB2018/050066, dated Apr. 26, 2018.
Korean Intellectual Property Office (ISA), International Search Report and Written Opinion for International Application No. PCT/US2018/033009, dated Sep. 11, 2018.
Korean Intellectual Property Office (ISA), International Search Report and Written Opinion for International Application No. PCT/US2018/032760, dated Sep. 11, 2018.
Korean Intellectual Propery Office (ISA), International Search Report and Written Opinion for International Application No. PCT/US2018/054423, dated Jan. 28, 2019.

* cited by examiner

VEHICLE BATTERY TRAY WITH TUBULAR PERIPHERAL WALL

CROSS-REFERENCE TO RELATED APPLICATION

This application claims benefit and priority under 35 U.S.C. § 119(e) of U.S. provisional application Ser. No. 62/558,100, filed Sep. 13, 2017, which is hereby incorporated herein by reference in its entirety.

TECHNICAL FIELD

The present invention generally relates to vehicle battery support structures, and more particularly to structural components for holding and supporting protected batteries, such as battery packs or modules or the like for electric and hybrid-electric vehicles.

BACKGROUND

Electric and hybrid-electric vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle. Similar to other vehicle components, low weight and high strength-to-weight ratio are important properties in battery support structural components.

SUMMARY

The present disclosure provides a perimeter wall for a vehicle battery tray that may comprise a tubular structure formed to extend along more than a single linear extent of the perimeter wall, such as around three sides or around the entire periphery of the battery tray. Such a construction can increase energy absorption and reduce intrusion distances for lateral vehicle impacts, along with reducing seams extending along or into the containment area of the battery tray. The tubular structure may use a single elongated reinforcement member that is formed to confirm to the relatively sharp corners of a battery tray by cutting notches along an interior portion of the member and bending the tubular member at the notches to form the desired angles at the corner portions of the battery tray. The tubular member may be bent in a manner to close the notch and thereby enclose the hollow interior of the tubular structure.

According to one aspect of the present disclosure, a battery tray is provided for supporting batteries at a lower portion of a vehicle frame. The battery tray includes a floor plate and a tubular member that extends along a periphery of the floor plate to form a perimeter wall around a containment area for storing vehicle battery cells. The perimeter wall is attached at an upper surface of the floor plate. The tubular member may include a single hollow beam, such as with a rectangular cross-sectional shape. The outer wall section of the tubular member may further provide a seamless surface around corner sections of the perimeter wall, such that the corner sections may have a welded seam along the inner wall section of the beam.

According to another aspect of the present disclosure, a battery tray is provided for supporting batteries at a lower portion of a vehicle frame. The battery tray includes a floor plate that has at least four perimeter edges. A perimeter wall is attached at an upper surface of the floor plate and includes a hollow metal beam that extends along at least three of the perimeter edges of the floor plate. An outer wall section of the hollow metal beam includes a seamless surface that extends around a corner section of the perimeter wall. Also, an inner wall section of the hollow metal beam may have a welded seam at the corner section of the perimeter wall, such that the corner section of the perimeter wall may have a closed notch seam extending along an upper wall section, the inner wall section, and a lower wall section of the hollow metal beam.

According to yet another aspect of the present disclosure, a method is provided for forming a vehicle battery tray. The method includes attaching a perimeter wall around a floor plate to substantially surround a containment area for storing vehicle battery cells. The perimeter wall may include a hollow metal beam that extends along at least three sides of the perimeter wall that are substantially perpendicular to each other. The method may further include laser cutting a notch along an upper wall section, a lower wall section, and an inner wall section of the hollow metal beam. The hollow metal beam may be bent to close the notch to form a corner section of the perimeter wall. It is also provided in an aspect of the disclosure that opposing ends of the hollow metal beam may be attached together to provide a continuous boundary around the containment area of the battery tray.

These and other objects, advantages, purposes, and features of the present disclosure will become apparent upon review of the following specification in conjunction with the drawings.

DETAILED DESCRIPTION

Figure 1:
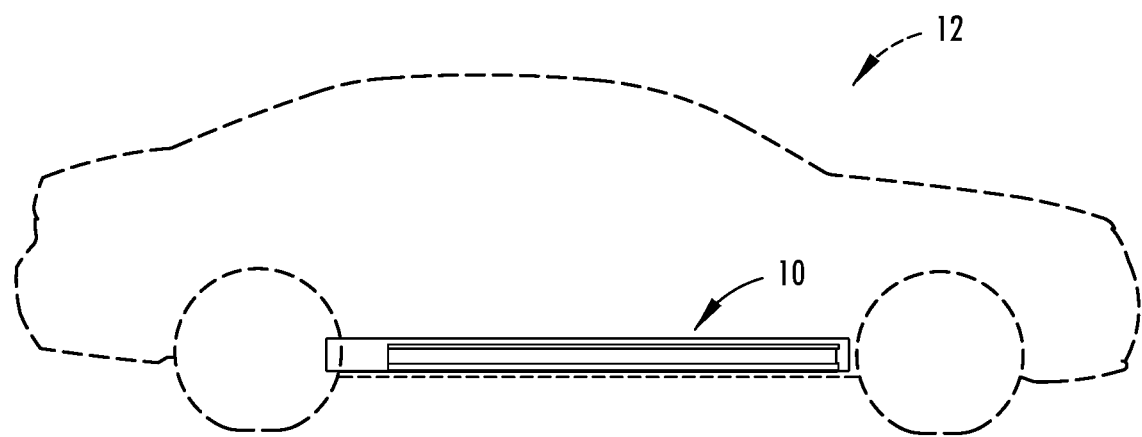
FIG. 1 is a side elevational view of a battery support structure secured at a mounting location on a vehicle.

Referring now to the drawings and the illustrative embodiments depicted therein, a vehicle battery tray or structure 10 is provided for supporting and protecting batteries, such as battery packs or modules or the like, for powering and operating electric motors and other electrical components of an electric or hybrid-electric vehicle 12, such as shown in FIGS. 1-5. The battery tray 10 may be attached or mounted at or near the lower portion of the vehicle 12, such as at the lower frame or rocker rails 14, which may also locate the batteries 16 contained in the battery tray 10 in a central location on the vehicle 12. Such a low and centralized location may avoid damage and disruption to the batteries 16 by being spaced away from probable impact locations on the vehicle frame, such as near the front and rear bumper areas. Also, such a mounting location of the tray 10 suspended and spanning below an interior cabin of the vehicle 12 may evenly distribute the weight of the batteries 16 on the vehicle frame between the wheels and may provide the vehicle 12 with a relatively low center of gravity due to the substantial weight of the batteries 16 held in the battery tray 10.

The battery tray 10 is provided with a base panel or floor plate 18 that forms the bottom containment structure of the battery tray 10. When the battery tray 10 is engage with the lower portion of the vehicle 12, the base panel or floor plate 18 of the battery tray 10 may be span below the interior cabin in generally parallel with the floor of the interior cabin of the vehicle 10, such that the base panel or floor plate 18 of the battery tray 10 may form the bottom or lowermost undercarriage surface of the vehicle body 12, as shown in FIG. 1.

The battery tray 10 may be disengaged or detached from the rocker rails 14 of the vehicle 12, such as for replacing or performing maintenance on the batteries 16 or related electrical components. To facilitate this optional disengagement or detachment from the vehicle 12, the battery tray 10 can be a modular design with standardized mounting locations capable of disengagement, such as with bolts or releasable fasteners or the like. Accordingly, the battery support tray 10 may accommodate various vehicle body types and designs.

Figure 3:
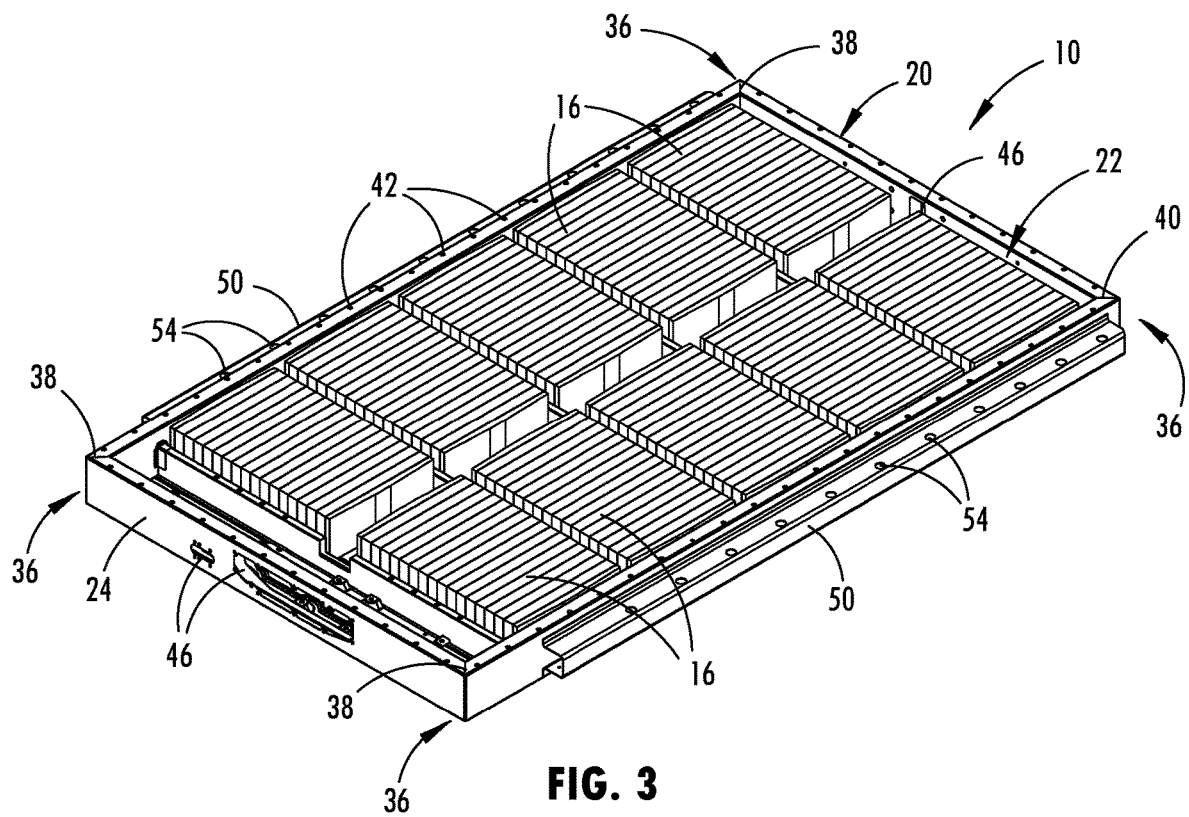
FIG. 3 is an upper perspective view of the battery support structure shown in FIG. 1, showing battery modules supported therein.
Figure 4:
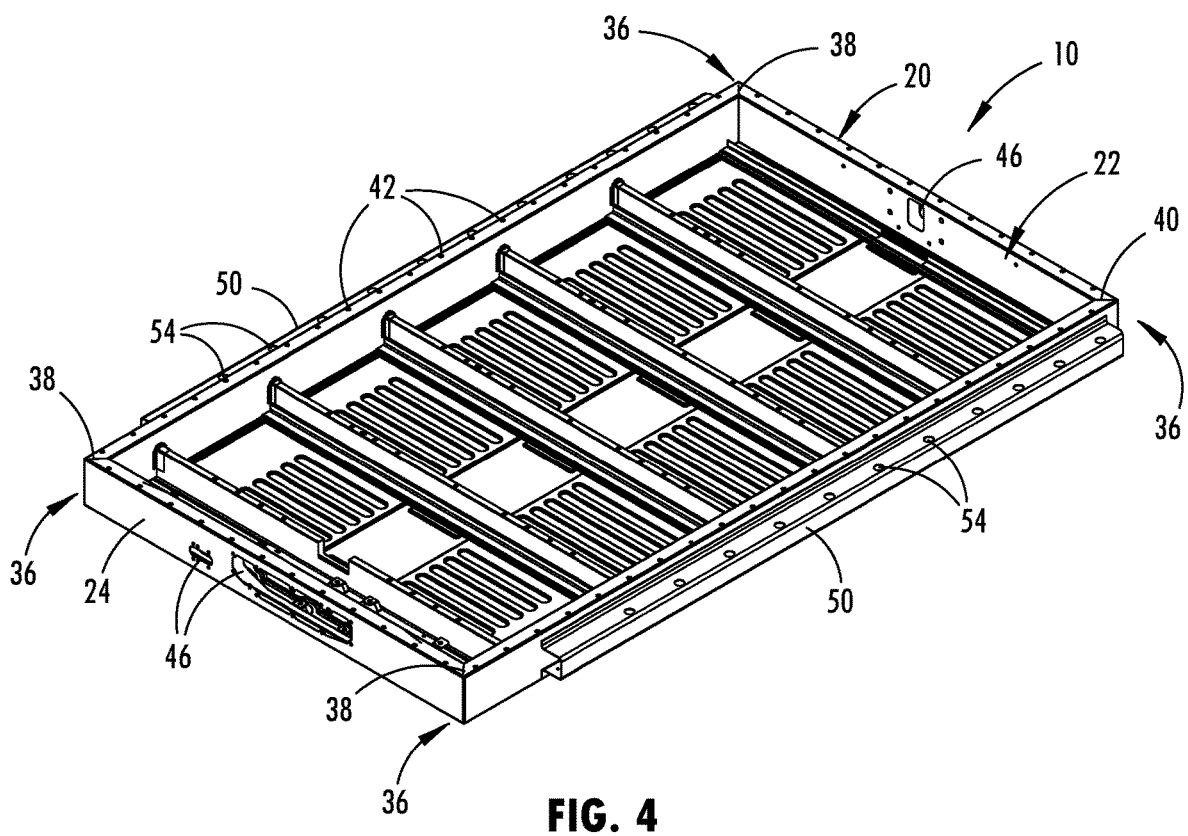
FIG. 4 is an upper perspective view of the battery support structure with the battery modules removed.
Figure 5:
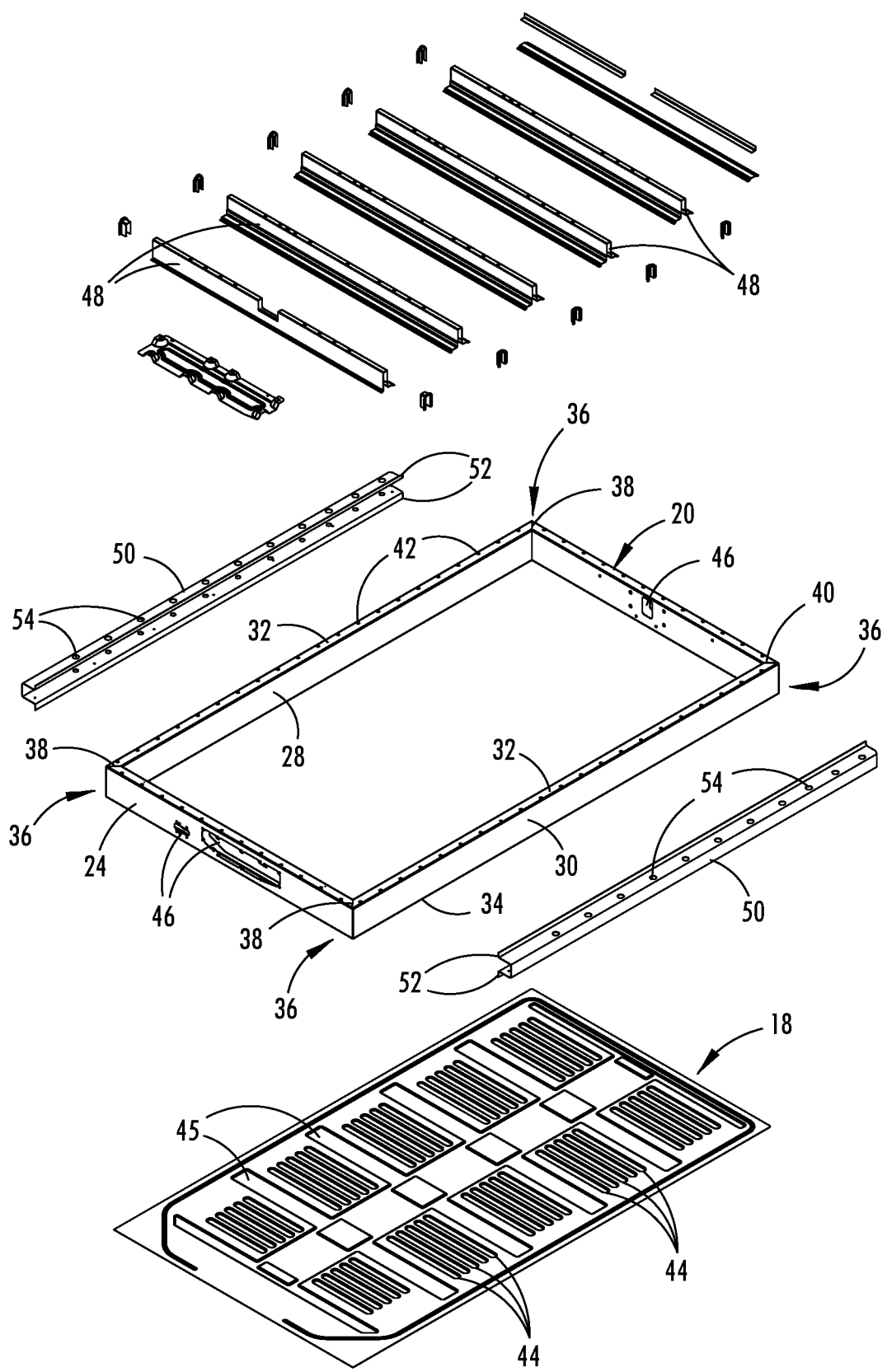
FIG. 5 is an exploded upper perspective view of the battery support structure.

As shown in FIGS. 3-5, the battery tray 10 includes a perimeter containment wall 20 that is disposed around a peripheral edge of the of the floor plate 18 to substantially surround a battery containment area 22 of the battery tray 10. The perimeter containment wall 20 is formed by at least one perimeter reinforcement member 24 that extends along at least one section or side of the peripheral edge of the floor plate 18 to provide a protective barrier around the battery containment area 22. Thus, the perimeter containment wall 20 may be segmented into separate members or beams that are attached together at the ends or may be a single beam.

To reduce the attachment seams and connection interfaces along the perimeter containment wall 20, which can be susceptible to leaks into and out of the battery containment area 22, the perimeter reinforcement member 24 may be bent or formed at a corner of the battery tray 10 to have at least a portion of the beam that continuously extends along more than a single linear side of the perimeter wall 20. For example, as shown in FIGS. 3-5, the perimeter reinforcement member comprises a single metal tubular beam that extends along four sides of the periphery of the battery tray 10 and its ends attach together to enclose the containment area 22.

Figure 2:
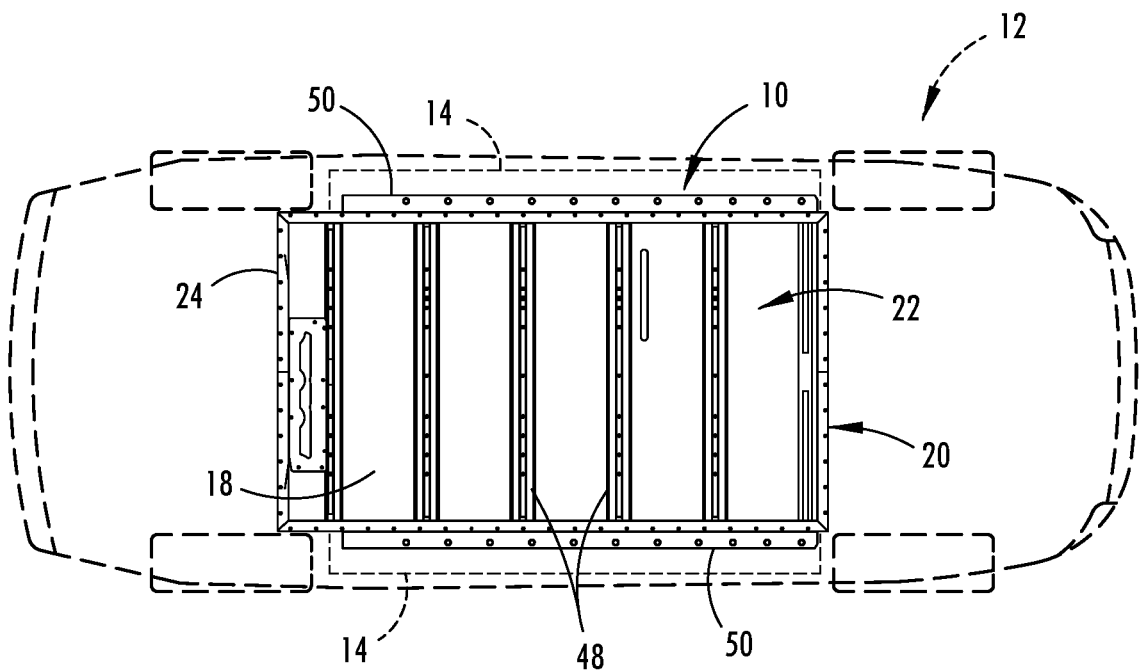
FIG. 2 is top plan view of the battery support structure shown in FIG. 1, illustrating rocker rails and other portions of the vehicle in dashed lines.

As shown in FIG. 2, the peripheral shape of the perimeter containment wall 20, when viewed from above, may be generally rectangular or square shaped, where the corners of the perimeter containment wall 20 are approximately 90 degrees. The interior surface of the perimeter containment wall 20 at such sharp angled corners can provide a corresponding square or rectangular shaped battery containment area 22. This orthogonal shape of the battery containment area 22 corresponds with a generally rectangular or orthogonal shape of the battery modules 16 shown in FIG. 3, and as such the battery containment area can be filled to its volumetric capacity and thereby maximize battery containment capacity of the tray 10. However, it is also contemplated that the peripheral shape may have alternative designs, such as shown in another example illustrated in FIG. 14 that is indented or angled at or near the front or rear wheel wells of the vehicle, but still may have some right-angled corners.

The illustrated perimeter containment wall 20 shown in FIGS. 1-5 has a single reinforcement member 24 that is a roll formed tubular beam having a closed cross-sectional shape, which may be roll formed from a metal sheet, such as a high-strength steel. The hollow or open interior channel 26 (FIG. 7) of the reinforcement member 24 may extend along a length of the respective beam. By having an exterior or outer wall section of the beam spaced from an interior or inner wall section by the interior channel 26, such a tubular construction can increase energy absorption and reduce intrusion distances for lateral vehicle impacts. The elongated reinforcement member or members may also or alternatively include a welded multi-sheet beam, a pultruded beam, an extruded beam or the like, where the shape and material of the reinforcement member or members may be adapted to absorb and reduce impact forces delivered to exterior portions of the battery tray 10. It is further contemplated that the perimeter reinforcement member or members may be made with polymer or related composites, aluminum, combinations of materials or like materials. Also, the reinforcement member or members may be formed to have various shapes and combinations of open and/or closed cross-sectional shapes or profiles.

As further shown in FIGS. 3-5, the tubular member 24 has a rectangular cross-sectional shape formed by an inner wall section 28, an outer wall section 30, an upper wall section 32, and a lower wall section 34 of the tubular beam. The inner and outer wall sections 28, 30 are generally perpendicular relative to a planar extent of the floor plate 18 and substantially coplanar with each other. Similarly, the upper and lower wall sections 32, 34 are generally parallel relative to the planar extent of the floor plate 18 and substantially coplanar with each other. The lower wall section 34 of the tubular beam 24 has a planar surface that is attached at the upper surface of the floor plate along the respective perimeter edge of the floor plate. The attachment of the perimeter wall 20 to the floor plate 18 may be done by welding, adhesive, or fasteners or other similar attachment interface that is generally adapted to form a sealed attachment seam that is impervious to liquid and gas.

Figure 8A:
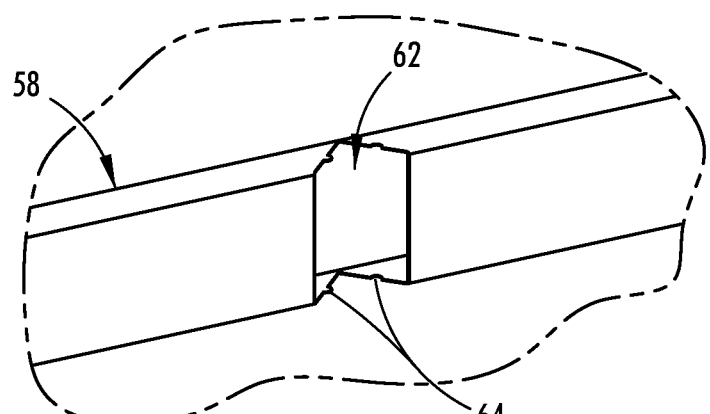
FIGS. 8A-8C are upper perspective views taken at a notched section of the tubular peripheral member, showing a corner bending process.
Figure 8B:
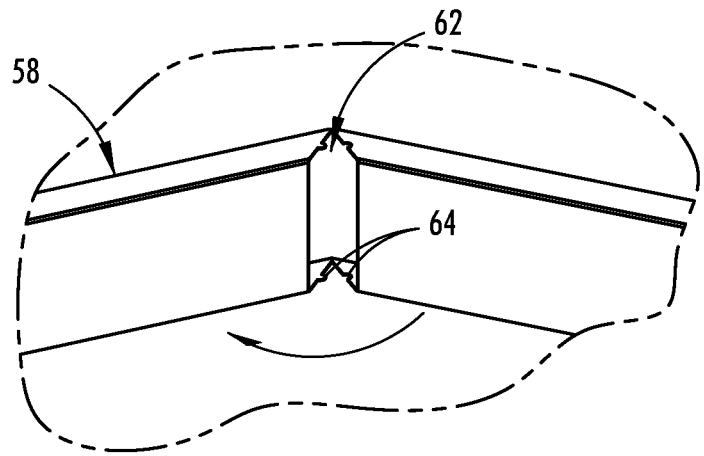
Figure 8C:
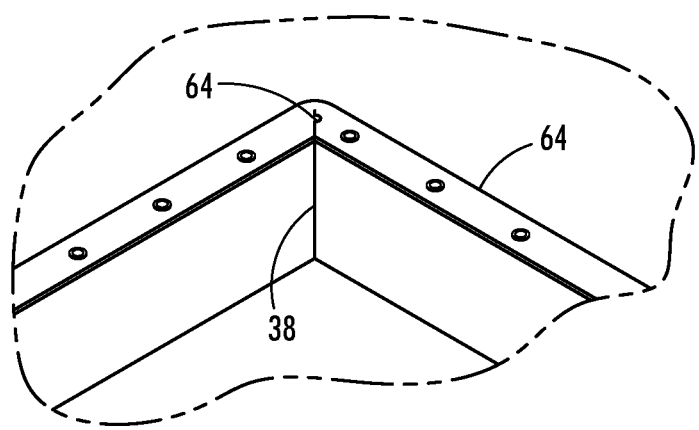

Referring again to the corner sections 36 of the perimeter wall 20, such as shown in FIGS. 3-5, the outer wall section 30 of the tubular member 24 may have a seamless surface around at least one corner section 36 of the perimeter wall 20. This seamless surface along the outer wall section 30 may have a small to negligible radiused curvature from bending the corner. To provide such a seamless surface at the outer wall section 36 at the sharp angled corner, a closed notch seam 38 may be provided at the corner sections 36 that extends along the upper, inner, and lower wall sections 32, 28, 34 of the beam 24, where such a forming process is shown in FIGS. 8A-8C and further described below. The closed notch seam 38 may be fixed when the notch seam is closed, so as to have a welded seam along at least the inner wall section 28 of the beam 24. It is also contemplated that a weld seam may be provided along the entire closed notch seam 38 to provide a sealed closure to the hollow interior of the tubular beam.

Figure 10:
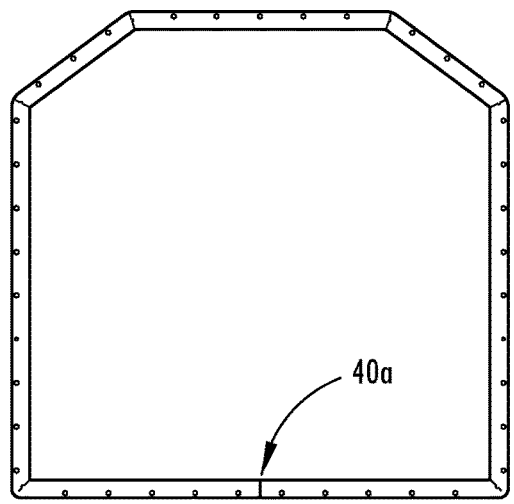
FIG. 10 is a top plan view of another example of a tubular peripheral wall of a batter support structure.
Figure 11:
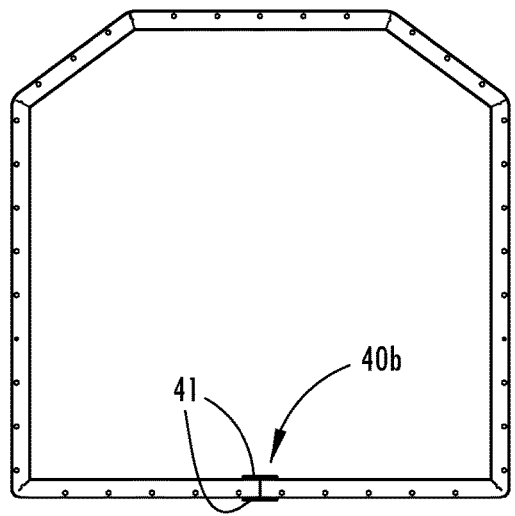
FIG. 11 is a top plan view of yet another example of a tubular peripheral wall of a batter support structure.

The corner sections 36 of the perimeter containment wall 20 shown in FIGS. 3-5 have a closed notch seam 38 at three of the corner sections 36 and a mitered end attachment 40 at the final corner to attach together the opposing ends of the tubular beam 24. The mitered end attachment 40 is formed by cutting each of the opposing ends of the tubular member 24 at an angle that is half of desired corner angle and securing the ends together, such as at 45 degrees for a 90 degree corner. The mitered end attachment 40 may be formed by welding, adhesive, or fasteners or other similar attachment interface that is generally adapted to form a sealed attachment seam that is impervious to liquid and gas. It is also contemplated that the ends of the tubular beam may be attached together at a straight-cut joint 40a, 40b, such as shown in FIGS. 10 and 11. As shown in FIG. 11, the end attachment joint 40b of the tubular beam is reinforced with brackets 41 that attach the inner and outer wall sections of the beam.

The perimeter wall 20 provides a generally consistent height with even and generally flush top and bottom surfaces for attaching a top cover or plate at the top surface and a bottom cover or floor plate 18 at the bottom surface, which together seal the upper and lower portions of the battery containment area 22. The top cover may be attached in a manner that is relatively easy to remove while maintaining the sealed battery containment area 22, such as via bolts, screws, or other removable fasteners that may compress a gasket or other sealing member between the top cover and the top surface of the perimeter wall 20. The removability of the top cover also allows access to the battery modules 16 or other electric components housed in the battery containment area 22 for replacement, maintenance, or inspection or the like. As further shown in FIG. 3, the upper wall section 32 of the perimeter wall 20 has fastener openings 42 that are configured to receive a mechanical fastener.

The floor plate 18, such as shown in FIG. 5, is a generally planar structure but may include formations adapted to improve structural stiffness of the floor and to adapt the floor for the battery modules 16. The floor plate 18 includes groupings of elongated depressions 44 that extend laterally on the floor plate 18 below sections of the battery containment area 22 that are each directly below a battery module 16. Such elongated depressions 44 increase lateral stiffness of the floor plate, while also providing air flow channels below the battery modules 16. Also, depressed features 45 are provided on the floor plate 18 that extend below the cross members 28 of the tray 10 to similarly provide structural strengthening and air flow improvements. The floor plate 18 may provide a sealed connection along the bottom surface of the perimeter wall 20 via welding, adhesive, or fasteners or the like. The seal between the floor plate 18 and the reinforcement member 24 forming the perimeter wall 20 may be reinforced or supplemented with a sealing agent or sealing material, such as an epoxy, silicone sealant, gasket material, or the like.

It is understood that the sealed battery containment area 22 may be vented for accommodating battery swelling or contraction, such as at a vented opening that is difficult for liquid or debris to enter, such as by locating the vented opening at an upper portion or interior portion or of the battery tray 10. For example, as shown in FIG. 5, end openings 46 in the perimeter containment wall 20 that are used for wiring may also be provided with an air conduit to assist with venting. Such a vented opening 46 may include a filter, membrane, or fabric cover that is air permeable and liquid impermeable to provide the desired liquid sealed environment for storing the batteries or electrical equipment or other vehicle-related item in the battery tray.

Referring again to FIGS. 3-5, the battery support structure 10 has cross members 48 that extend laterally to attach between the inside surfaces or inner wall sections 28 of the tubular member 24 at opposing lateral side sections of the perimeter wall 20. The cross members 48 span between the lateral side sections of the reinforcement members 24 to transmit lateral loads and impact forces through generally linear load paths along the cross members 48 to prevent laterally inward deformation to the reinforcement member 24 and thus limit disruption to the battery containment area 22. The cross members 48 may be formed to have a height that is less than the height of the perimeter wall 20. Accordingly, the cross members 48 may, provide a direct load path transmission between the lateral side sections of the perimeter wall 20.

The battery tray 10 shown in FIGS. 3-5 also includes outer rail extensions 50 that are attached at opposing longitudinal sides or portions of the perimeter containment wall 20 of the battery tray 10. As illustrated, the rail extensions 50 have a C-shaped or hat shaped cross sectional shape, where the end flanges 52 of the cross-sectional shape are attached to the outer wall sections 30 of the tubular beam 24 of the perimeter containment wall 20. The rail extensions 50 extend laterally outboard from the outer wall sections 30 of the metal tubular beam 24 to provide a mounting structure for the battery tray 10 to attach to the frame of the vehicle 12. Specifically, as shown in FIG. 2, the upper section of the rail extensions 50 have fastener holes 54 that may be used to attach the rail extensions 50 to the rocker rails 14, such that the rail extensions 50 also allow the batteries 16 contained in the battery tray 10 to be secured further inboard from the outer perimeter of the overall vehicle frame structure.

Several different attachment techniques and configurations may be used to permanently or releasable secure the battery support structure to a vehicle frame, such as below a floor of the vehicle and generally between the axles. Further, with respect to the general installation or attachment or formation, the steps discussed herein may be performed in various different sequences from those discussed to result in engaging, disengaging, or forming the battery support structure or components thereof.

Figure 6:
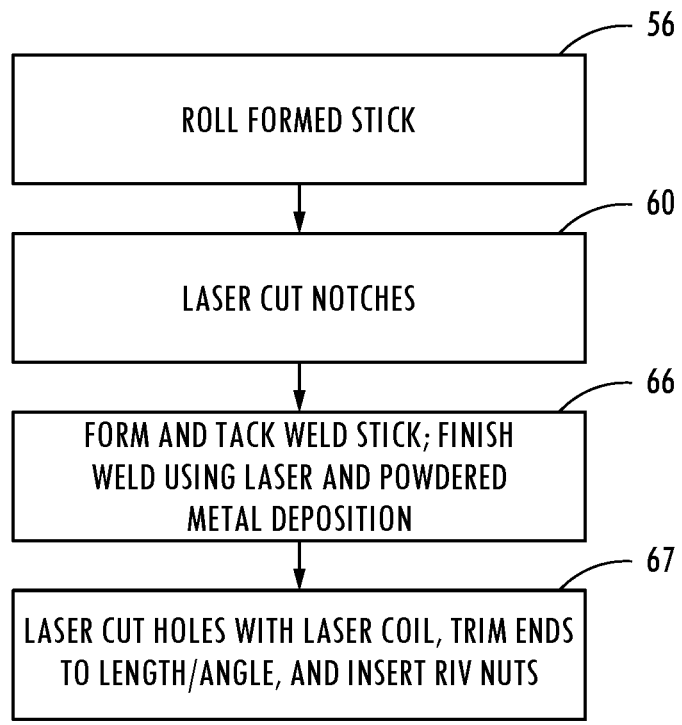
FIG. 6 is a flow chart of a forming process for a tubular peripheral member.
Figure 7:
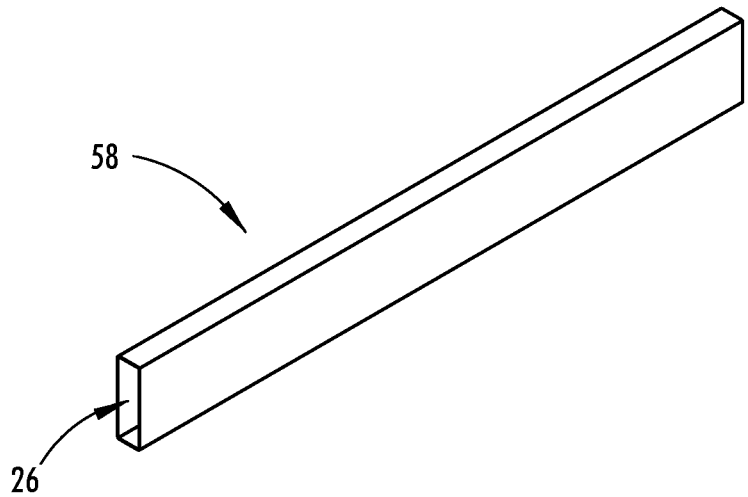
FIG. 7 is an upper perspective view of a tubular peripheral member at an initial step of the forming process shown in FIG. 6.

Further, as shown in FIG. 6, an exemplary flow chart is provided that shows the process of forming the perimeter wall 20. At step 56, a straight roll formed beam 58 may be provided having a generally rectangular cross sectional shape, such as shown in FIG. 7. The roll formed beam 58 may then be trimmed with a laser or other cutting device, at step 60, to provide notches 62 along the beam 58 at the desired bending points that correspond to the shape and desired angular corner bends of the perimeter wall 20, such as shown in FIG. 8A. For example, the beam may be provided in approximately less than 28 foot length to accommodate a laser cutting machine. Specifically, the notches may remove material along three of the four wall section of the beam 58, where the remaining exterior or outer wall section may be the bending point and the top and bottom walls have angular cutouts that correspond to the desired angle of the corner transition in the perimeter wall 20 of the battery tray 10. The notches 62 at the top and bottom walls may also include interlocking features 64 to provide a more surface area along the weld seam and increased stability of the seam. After the notches are formed, the beam is bent to close the notches 62 along the beam 58, such as shown in FIG. 8B. This bending may be done at a bending station. Once the beam 58 is bent as shown in FIG. 8C, the closed notches 62 are fixed in the closed position, such as by using a laser welding process with or without filler wire or powered metal deposition at step 66 in FIG. 6. Further, at step 67, the ends may be trimmed and holes may be formed, such as the fastener openings 42 in the upper wall section 32 of the perimeter wall 20 and the end openings 46 in the perimeter containment wall 20 that are used for wiring. It is also contemplated that riv nuts or other fastener receivers or finishings may be inserted in the formed holes or openings.

Figure 9:
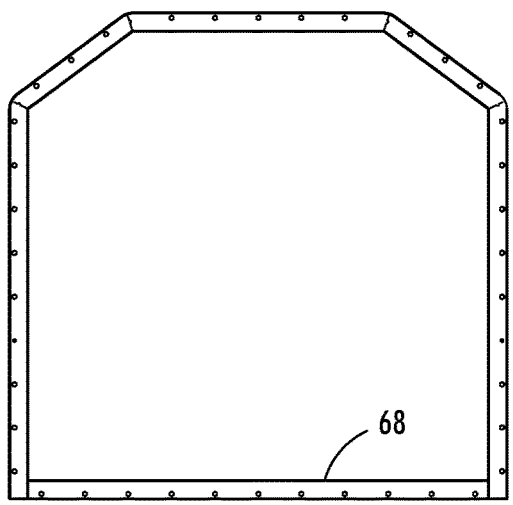
FIG. 9 is a top plan view of an additional example of a tubular peripheral wall of a batter support structure.

As shown in an additional example of a perimeter wall in FIG. 9, the perimeter wall includes an additional wall member 68 that connects between end portions of the reinforcement member to provide a continuous perimeter wall around the containment area of the battery tray. This is provided in the illustrated embodiment shown in FIG. 9 at the rear of the battery tray. In areas where collision impact may not have a high risk or likelihood of interacting with the containment wall, such as at the front or rear, the additional wall member may be provided with an alternative cross-sectional shape and with less or lighter material, as it may not need to be designed to withstand or manage the same impact energy as the wall member at other areas of the perimeter wall.

Figure 12:
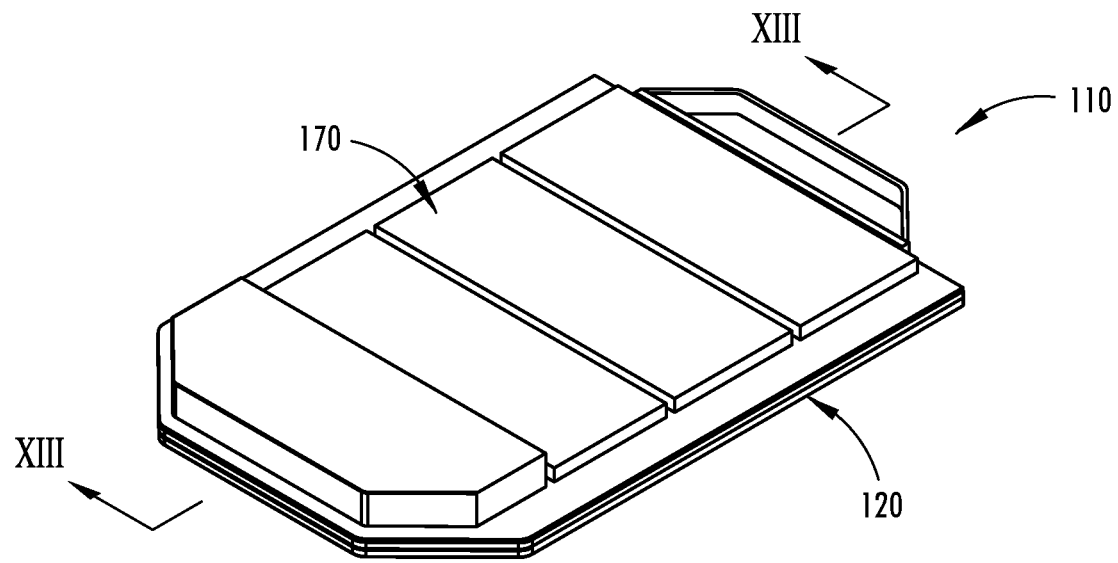
FIG. 12 is an upper perspective view of another example of a battery support structure, showing a cover enclosing the battery containment area.
Figure 13:
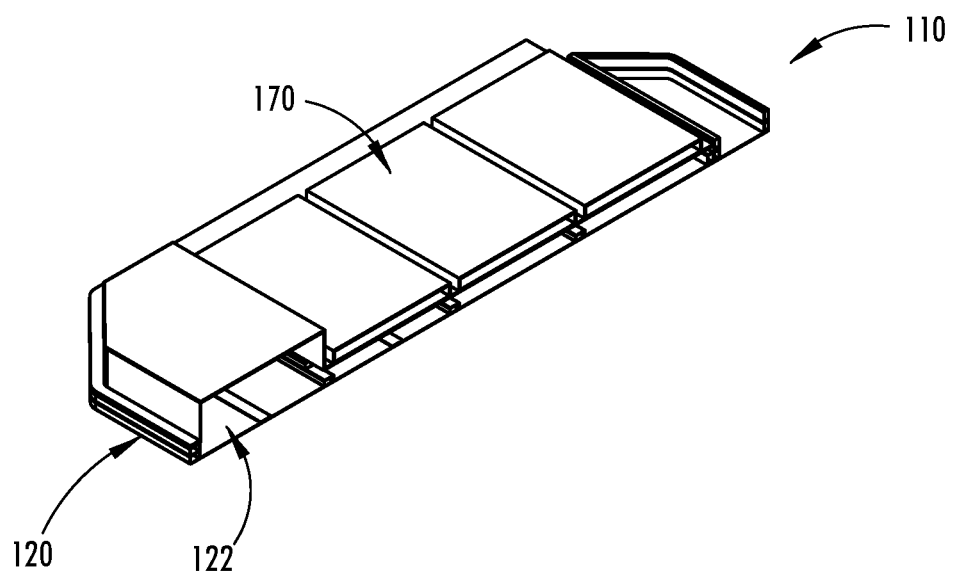
FIG. 13 is a cross-sectional view of the battery support structure shown in FIG. 12, taken at line XIII-XIII shown in FIG. 12.
Figure 14:
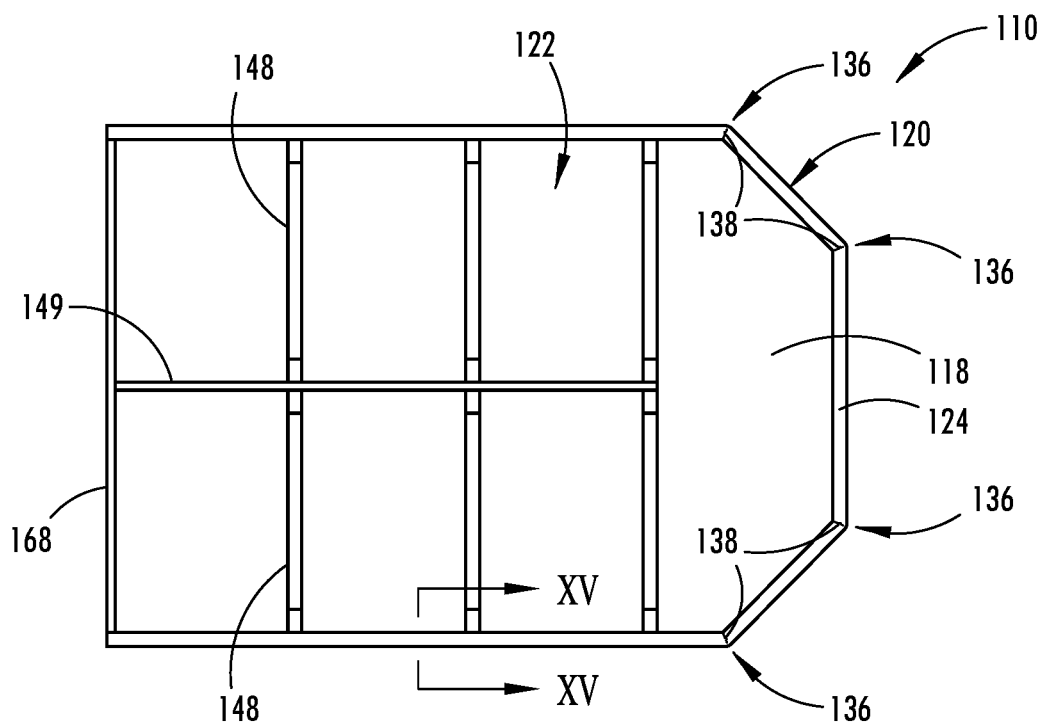
FIG. 14 is a top plan view of the battery support structure shown in FIG. 12, having the cover removed.
Figure 15:
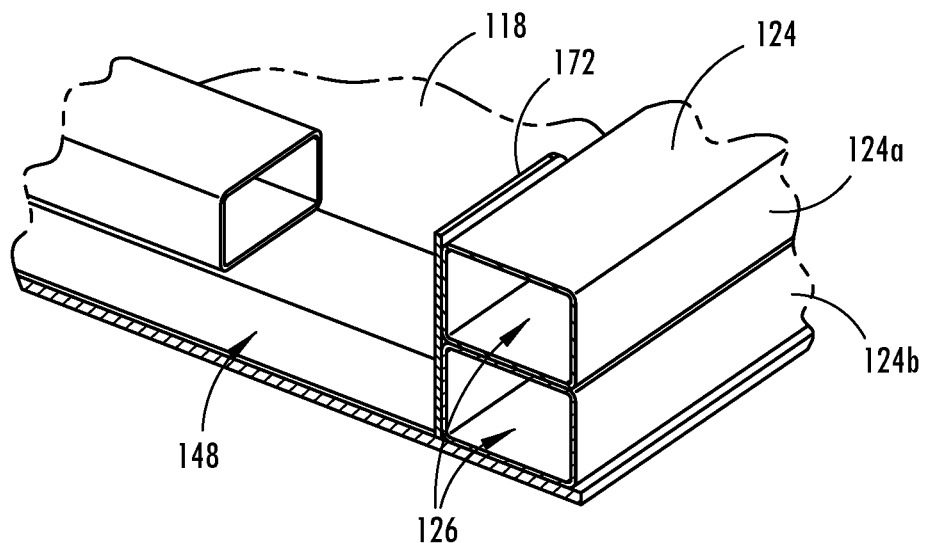
FIG. 15 is a cross-sectional view of the battery support structure shown in FIG. 14, taken at line XV-XV.
Figure 16A:
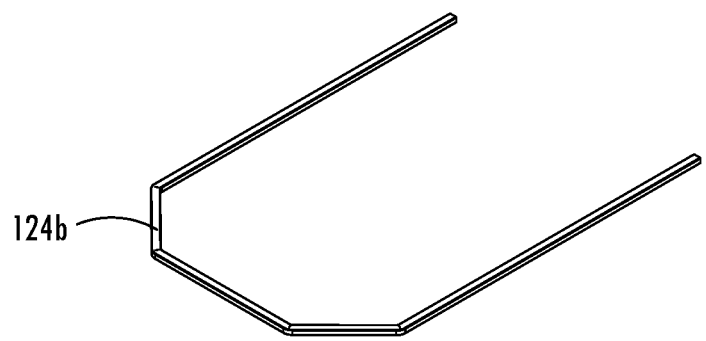
FIGS. 16A-16D are upper perspective views of an assembly process for forming a tray wall and a floor portion of the battery tray shown in FIG. 12.
Figure 16B:
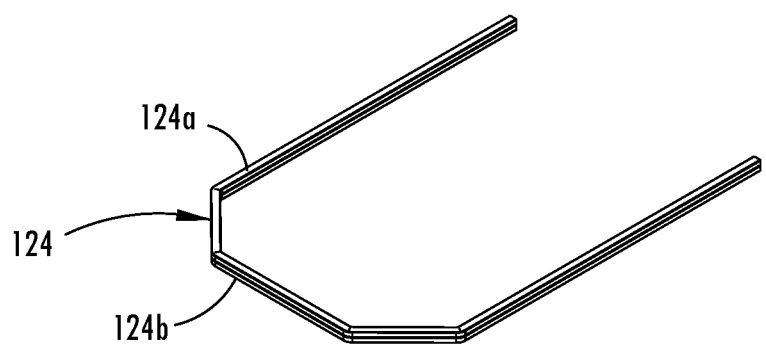
Figure 16C:
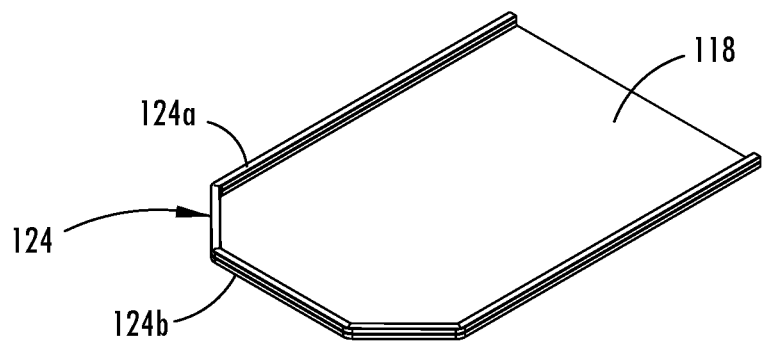
Figure 16D:
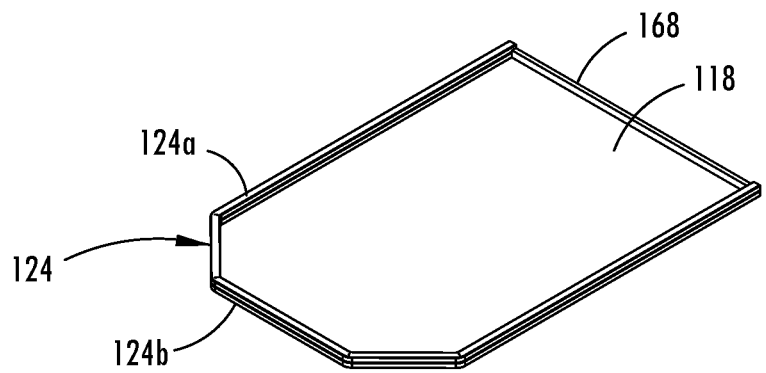

Referring now to FIGS. 12-17, an additional example of a battery tray 110 includes a perimeter wall 120 that is disposed around the of the floor plate 118 to substantially surround the containment area 122. The perimeter wall 120 includes at least two reinforcement members 124 that are disposed in a stacked multi-tubular structure that extends along more than a single linear extent of the perimeter wall 120, such as shown in FIG. 14 extending along three sides of the periphery of the battery tray 110. The illustrated stacked multi-tubular structure of the perimeter wall 120 includes two reinforcement members 124, such as shown in FIG. 15, that are attached together with a lower wall section of an upper reinforcement member 124a disposed at or against an upper wall section of a lower reinforcement member 124b, such that the inner and outer wall sections of the upper and lower reinforcement members 124a, 124b are aligned to be substantially coplanar with each other.

The perimeter reinforcement members 124 may be bent or formed at a corner section 136 of the battery tray 110 to have at least a portion of the beam that continuously extends along more than a single linear side of the perimeter wall 120, such as provided by a closed notch seam 138. As shown in FIG. 14, the stacked multi-tubular structure of perimeter reinforcement members 124 extends along three sides of the perimeter wall 120 so as to form a horseshoe shape along the front and opposing lateral sides of the battery tray 110. The perimeter wall 120 also includes an additional wall member 168 that connects between end portions of the two reinforcement members 124 to provide a continuous boundary around the containment area 122 of the battery tray 110. The additional wall member 168 has a smaller thickness to reduce weight, as additional material is not necessary to withstand or manage probable impact energy.

This seamless surface along the outer wall sections of the closed notch seams 138 may have a small to negligible radiused curvature from bending the corner. The closed notch seam 138 may be provided at the corner sections 136 that extends along the upper, inner, and lower wall sections of the stacked beam 124, where such a forming process is shown in FIGS. 8A-8C. The closed notch seam 138 may be fixed when the notch seam is closed, so as to have a welded seam along at least the inner wall section of the stacked beams 124. It is also contemplated that a weld seam may be provided along the entire closed notch seam 138 to provide a sealed closure to the hollow interiors 126 of the tubular beams 124a, 124b.

Figure 17:
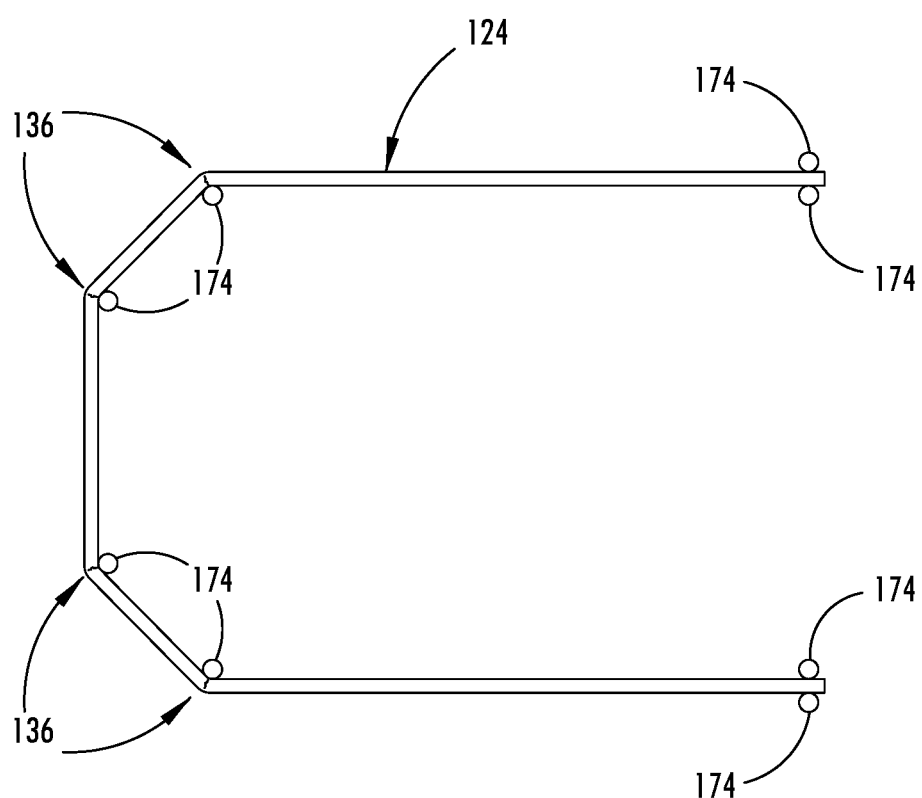
FIG. 17 is a top plan view of a tubular peripheral member held in a fixture during the assembly process.
Figure 18:
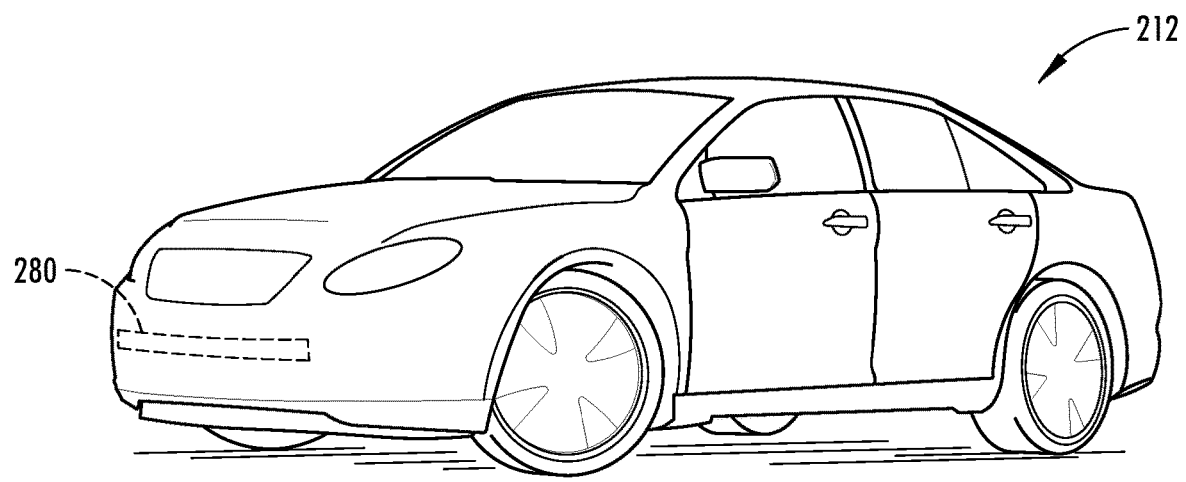
FIG. 18 is a perspective view of an additional embodiment of a vehicle, showing a bumper reinforcement beam in dashed lines.

The multi-tubular structure of perimeter reinforcement members 124 may be formed at a fixture, such as shown in FIG. 17 with pegs 174 that are disposed at the corner sections 136 of the perimeter wall 120. The pegs 174 may be used to hold the shape of the reinforcement members 124 as they are secured together in the stacked arrangement. Also or alternatively, the pegs 174 may be used to bend the reinforcement members at the corner sections 136 and close the notches when forming the closed notch seams 138. The reinforcement members 124 may be attached together, such as with applying adhesive or welding, so as to form the stacked arrangement extending upward from the floor plate 118.

As shown in FIGS. 12 and 13, the perimeter wall 120 provides a generally consistent height with even and generally flush top surfaces for attaching a top cover 170. The cover 170 is attached at the top surface of the upper tubular beam 124a, such that the floor plate 118 and the cover 170 together seal the upper and lower portions of the battery containment area 122. The top cover 170 may be attached in a manner that is relatively easy to remove while maintaining the sealed battery containment area 122, such as via bolts, screws, or other removable fasteners that may compress a gasket or other sealing member between the top cover 170 and the top surface of the perimeter wall 120. The removability of the top cover 170 also allows access to the battery modules or other electric components housed in the battery containment area 122 for replacement, maintenance, or inspection or the like.

As further shown in FIGS. 13-15, the battery support structure 110 has cross members 148 that extend laterally to attach between the inside surfaces or inner wall sections of the tubular members 124 at opposing lateral side sections of the perimeter wall 120. As shown in FIG. 15, the cross members 148 may include end brackets 172 that span vertically along the interior surfaces of the tubular members 124*a*, 124*b*, such that loads transmitted by the cross members are distributed to both tubular members. The cross members 148 may be formed to have a height along sections of the cross members that is less than the height of the peripheral wall 120, such as from section of the cross members 148 have a stacked tube structure and other sections having a single tube height. The cross members 148 may also attach at a central longitudinal beam 149. The cross members 148 may be formed to have a height in sections that is less than the height of the peripheral wall 120. Accordingly, the cross members 148 may, together with the central longitudinal beam 149, provide a direct load path transmission between the lateral side sections of the perimeter wall 120.

Features of the battery tray 110 that are similar to the battery tray 10 may not be described in detail again, and similar reference numbers are used, incremented by 100.

Figure 19:
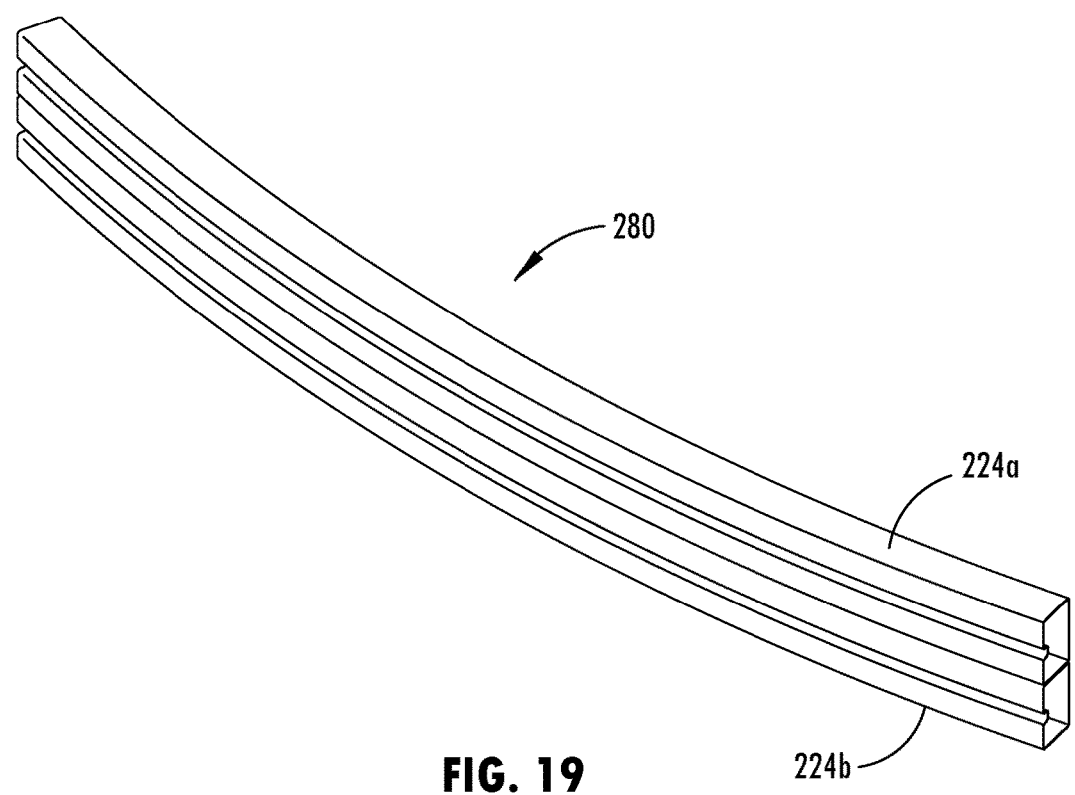
FIG. 19 is an upper perspective view of the bumper reinforcement beam shown in FIG. 18, having two tubes in a stacked arrangement.
Figure 20:
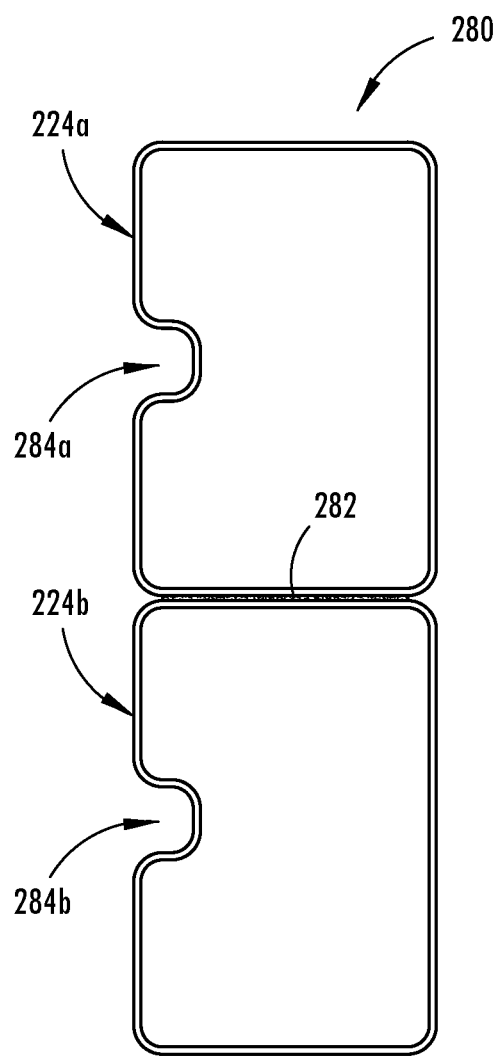
FIG. 20 is a cross-sectional view of the bumper reinforcement beam shown in FIG. 19, illustrating the two tubes attached together with an adhesive layer.
Figure 21:
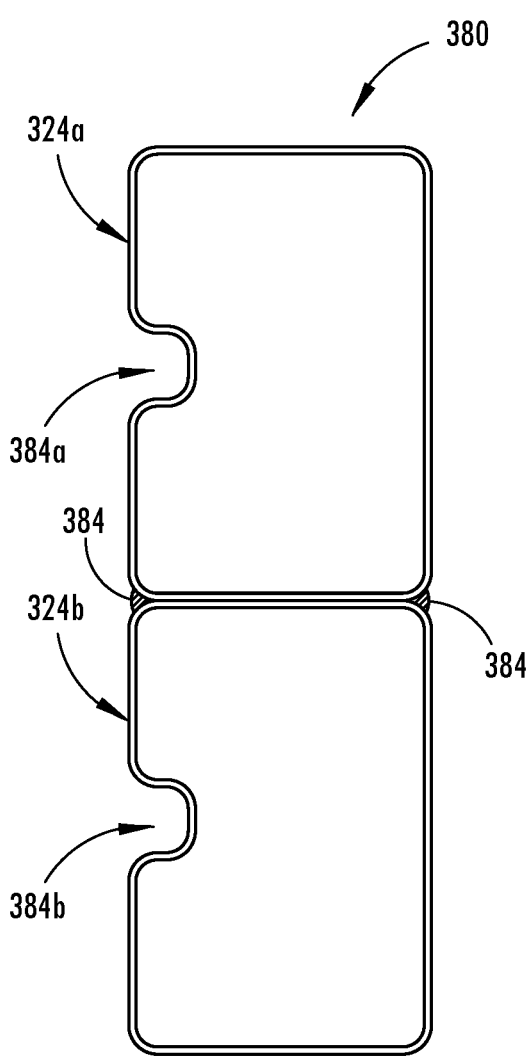
FIG. 21 is a cross-sectional view of an additional example of a bumper reinforcement beam, illustrating two tubes of the beam attached together with weld seams.

Referring now to FIGS. 18-21, a vehicle 212 may be equipped with a bumper reinforcement beam 280 that has a stacked tubular arrangement similar to the reinforcement beams 124 used in the perimeter wall 120 of the battery tray 110 shown in FIGS. 12-17. The vehicle reinforcement beam 280 is configured to span laterally across a vehicle frame, where opposing end portions of the reinforcement beam are configured to attach at the vehicle frame. As shown in FIGS. 19-21, the reinforcement beam 280 has two members or beams 224*a*, 224*b* that are separately roll formed from a metal sheet, such as sheet steel material having a thickness of 0.8 mm to 1.4 mm and a tensile strength of about 800 to 2000 MPa. The separate beams 224*a*, 224*b* are then attached together in the stacked tubular arrangement to provide a multi-tubular reinforcement beam. As shown in FIG. 20, the beams 224*a*, 224*b* are attached together with an adhesive layer 282 that securely bonds the beams together. The lower wall section of the upper reinforcement member 224*a* is adhered along and against the upper wall section of the lower reinforcement member 224*b*, such that the adhered wall sections provide a center wall of the bumper reinforcement beam 280 with a doubled wall thickness.

As shown in FIG. 20, the overall bumper reinforcement beam 280 is about 80 mm high and 40 mm deep, where each of the individual beams 224*a*, 224*b* have a channel rib 284*a*, 284*b* formed in a front face of the respective beam. Each illustrated channel rib is about 8-10 mm deep and 8-10 mm wide, and includes a rounded bottom having a semicircular shape. Nonetheless, it is contemplated that a depth and size of the channel ribs can be made shallow, deeper, wider, narrower, flat-bottomed, or otherwise modified to satisfy specific functional requirements of a beam.

As further shown in FIG. 21, an additional embodiment of the bumper reinforcement beam 380 has a stacked tubular arrangement with the two members or beams 324*a*, 324*b* welded together. Similar to the vehicle reinforcement beam 280 shown in FIG. 20, the vehicle reinforcement beam 380 is configured to span laterally across a vehicle frame, where opposing end portions of the reinforcement beam are configured to attach at the vehicle frame. The two members or beams 324*a*, 324*b* that are separately roll formed from a metal sheet, such as sheet steel material having a thickness of 0.8 mm to 1.4 mm and a tensile strength of about 800 to 2000 MPa. The beams 324*a*, 324*b* are attached together with weld seams 384 that securely attaches the beams together. The lower wall section of the upper reinforcement member 324*a* is welded against the upper wall section of the lower reinforcement member 324*b*, such that the fixed wall sections provide a center wall of the bumper reinforcement beam 380 with a doubled wall thickness. The welding of the weld seams 384 may be done simultaneously via laser welding. Alternatively, the welding can occur in two separate steps and by alternative welding methods.

As similarly shown in FIG. 21, the overall bumper reinforcement beam 380 is about 80 mm high and 40 mm deep, where each of the individual beams 324*a*, 324*b* have a channel rib 384*a*, 384*b* formed in a front face of the respective beam. Each illustrated channel rib is about 8-10 mm deep and 8-10 mm wide, and includes a rounded bottom having a semicircular shape. Nonetheless, it is contemplated that a depth and size of the channel ribs can be made shallow, deeper, wider, narrower, flat-bottomed, or otherwise modified to satisfy specific functional requirements of a beam.

It is to be understood that the specific devices and processes illustrated in the attached drawings, and described in this specification are simply exemplary embodiments of the inventive concepts defined in the appended claims. Hence, specific values and other precise physical characteristics relating to the embodiments disclosed herein are not to be considered as limiting, unless the claims expressly state otherwise.

Changes and modifications in the specifically described embodiments may be carried out without departing from the principles of the present disclosure, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A battery tray for supporting batteries at a lower portion of a vehicle frame, said battery tray comprising:
    a floor plate;
    a first tubular member comprising a hollow beam having a lower wall section attached at an upper surface of the floor plate and extending along a peripheral section of the floor plate, the first tubular member comprising a metal sheet with edge portions welded together to form a weld seam along a length of the hollow beam;
    a second tubular member comprising a hollow beam having a lower wall section fixedly attached at an upper wall section of the first tubular beam with a weld in a stacked tubular arrangement separate from the vehicle frame, the second tubular member comprising a metal sheet with edge portions welded together to form a weld seam along a length of the hollow beam; and
    wherein the second tubular member extends along the peripheral section to form a perimeter wall with the first tubular member at least partially around a battery containment area that is disposed above the upper surface of the floor plate.

2. The battery tray of claim 1, wherein the hollow beams of the first and second tubular members each have a rectangular cross-sectional shape.

3. The battery tray of claim 1, wherein the first and second tubular members each have aligned inner and outer wall sections that are generally perpendicular relative to the floor plate.

4. The battery tray of claim 3, wherein the first and second tubular members each include a corner section between linear sections of the perimeter wall that extend along corresponding linear sections of the peripheral section of the floor plate.

5. The battery tray of claim 4, wherein the outer wall sections of the first and second tubular members comprise a seamless surface around the corner sections.

6. The battery tray of claim 5, wherein the corner sections have a welded seam along at least the inner wall sections of the first and second tubular members to form a closed notch seam.

7. The battery tray of claim 1, wherein the lower wall section of the hollow beam comprises a planar surface that is welded at the upper surface of the floor plate.

8. The battery tray of claim 3, wherein a plurality of cross members attach at the inner wall sections of the tubular member at opposing lateral sides of the perimeter wall and extend across the battery containment area.

9. A battery tray for supporting batteries at a lower portion of a vehicle frame, said battery tray comprising:
a floor plate that has at least four perimeter edges;
a perimeter wall attached at an upper surface of the floor plate and comprising (i) a first hollow metal beam extending along at least three of the perimeter edges of the floor plate and (ii) a second hollow metal beam fixedly attached at an upper wall of the first hollow metal beam and extending along the at least three of the perimeter edges of the floor plate;
wherein an outer wall section of each of the first and second hollow metal beams comprises a seamless surface that extends around a corner section of the perimeter wall; and
wherein an inner wall section of each of the first and second hollow metal beams comprise a welded seam at the corner section of the perimeter wall.

10. The battery tray of claim 9, wherein the first and second hollow metal beams are welded together.

11. The battery tray of claim 9, wherein the first and second hollow metal beams each comprise a rectangular cross-sectional shape.

12. The battery tray of claim 11, wherein the inner and outer wall sections are generally perpendicular relative to the floor plate.

13. The battery tray of claim 11, wherein the welded seam at the corner section extends along an upper wall section and a lower wall section of the first and second hollow metal beams.

14. The battery tray of claim 9, wherein at least two corner sections of the perimeter wall comprise a closed notch seam extending along an upper wall section, the inner wall section, and a lower wall section of each of the first and second hollow metal beams.

15. The battery tray of claim 9, wherein a lower wall section of the first hollow metal beam comprises a planar surface that is welded to the upper surface of the floor plate.

16. The battery tray of claim 9, wherein a plurality of cross members attach at the inner wall section of each of the first and second hollow metal beams at opposing lateral side sections of the perimeter wall and extend across a battery containment area.

17. The battery tray of claim 9, wherein the perimeter wall includes an additional beam that extends between ends of the first and second hollow metal beams to provide a continuous boundary around a battery containment area.

18. A method for forming a vehicle battery tray, said method comprising:
providing a floor plate;
attaching a perimeter wall around the floor plate to substantially surround a containment area for storing vehicle battery cells;
wherein the perimeter wall includes a pair of hollow metal beams welded together in a stacked tubular arrangement that continuously extends along at least three sides of the perimeter wall that are substantially perpendicular to each other; and
wherein the pair of hollow metal beams each comprise a metal sheet with edge portions welded together to form a weld seam along a length of the respective hollow metal beam.

19. The method of claim 18, further comprising:
laser cutting a notch along an upper wall section, a lower wall section, and an inner wall section of the pair of hollow metal beams; and
bending the pair of hollow metal beam to close the notch to form a corner section of the perimeter wall.

20. The method of claim 19, wherein opposing ends of the pair of hollow metal beams are attached together to provide a continuous boundary around the containment area of the battery tray.

* * * * *

UNITED STATES PATENT AND TRADEMARK OFFICE
CERTIFICATE OF CORRECTION

| | | |
|---|---|---|
| PATENT NO. | : 11,088,412 B2 | Page 1 of 1 |
| APPLICATION NO. | : 16/130580 | |
| DATED | : August 10, 2021 | |
| INVENTOR(S) | : Joseph Robert Matecki and Mark Charles Stephens | |

It is certified that error appears in the above-identified patent and that said Letters Patent is hereby corrected as shown below:

On the Title Page

Item [73], the residence data of the Assignee:
Please delete "Kalamazoo, MI" and add: -- Grand Haven, MI --.

Signed and Sealed this
Sixth Day of May, 2025

Coke Morgan Stewart
*Acting Director of the United States Patent and Trademark Office*